United States Patent
Rashad

(10) Patent No.: US 9,752,856 B2
(45) Date of Patent: Sep. 5, 2017

(54) PROTECTIVE COLLAPSIBLE SHIELD

(71) Applicant: Michael Blake Rashad, Stone Mountain, GA (US)

(72) Inventor: Michael Blake Rashad, Stone Mountain, GA (US)

(73) Assignee: Michael Blake Rashad, Stone Mountain, GA (US)

( * ) Notice: Subject to any disclaimer, the term of this patent is extended or adjusted under 35 U.S.C. 154(b) by 236 days.

(21) Appl. No.: 14/744,658

(22) Filed: Jun. 19, 2015

(65) Prior Publication Data
US 2016/0054101 A1  Feb. 25, 2016

Related U.S. Application Data

(60) Provisional application No. 62/040,162, filed on Aug. 21, 2014.

(51) Int. Cl.
*F41H 5/08* (2006.01)
*A01K 29/00* (2006.01)

(52) U.S. Cl.
CPC ............... *F41H 5/08* (2013.01); *A01K 29/00* (2013.01)

(58) Field of Classification Search
CPC .... A41D 13/00; A41D 13/0518; A01K 29/00; F41H 5/08
USPC ........................................................... 2/2.5
See application file for complete search history.

(56) References Cited

U.S. PATENT DOCUMENTS

| | | |
|---|---|---|
| 5,392,686 A | 2/1995 | Sankar |
| 6,807,890 B1 | 10/2004 | Fuqua |
| 8,418,595 B1 | 4/2013 | Saucedo et al. |

OTHER PUBLICATIONS

San Tan Gear; "Flexible, lightweight ballistic shield fits anywhere"; 24th Annual Motor Vehicle Criminal Interdiction Conference; http://www.policeone.com/police-products/tactical/ballistic-shields/articles/6982725-Flexible-lightweight-ballistic-shield-fits-anywhere/; www.santangear.com; Copyright 2014 PoliceOne,com; Jul. 15, 2014; 4 pgs.
Dog Handler Shield: Police equipment and riot kit from MLA; http://www.mlapoliceequipment.co.uk/product/dog-handler-shield/; Jul. 15, 2014; 2014 MLA Ltd.; 2 pgs.

*Primary Examiner* — Katherine Moran
(74) *Attorney, Agent, or Firm* — Eversheds-Sutherland (US) LLP

(57) ABSTRACT

A protective collapsible shield is provided. The protective collapsible shield may include a first panel, a second panel and a third panel. The first and second panels each have a rectangular protrusion or lip extending from a bottom edge. The third panel includes slots for housing the first panel and the second panel. The third panel further includes snapping straps for securing the first and second panels in the slots when the protective collapsible shield is in a retracted state. The third panel further includes multiple locking mechanisms. Each of the locking mechanisms includes a cylindrical rod, a handle fastened to the cylindrical rod and a housing for receiving the cylindrical rod. The locking mechanisms engage with the first and second rectangular protrusions to secure the first and second panels in the slots when the protective collapsible shield is in an extended state.

20 Claims, 7 Drawing Sheets

PROTECTIVE COLLAPSIBLE SHIELD

CROSS-REFERENCE TO RELATED APPLICATIONS

This application claims priority to and benefit of U.S. patent application Ser. No. 62/040,162 filed on Aug. 21, 2014, and entitled "Top Dogg's Dog Bite Prevention Shield." The disclosure of the aforementioned application is entirely incorporated herein by reference.

BACKGROUND

Dog bites are a serious issue that can create dire consequences. It is estimated that annually, approximately one thousand U.S. citizens are brought to emergency care for a dog bite injury. For example, the dog bites of Molosser breeds cause 81% of dog attacks that induce bodily harm, 72% of dog attacks that result in fatalities, and 81% of attacks that result in maiming. Additionally, trainers and retrievers of lost or stray dogs have a high percentage of getting bitten from dog attacks. Many individuals going about their daily lives who are unfortunately attacked by dogs may find it necessary to find any instrument they can to protect themselves. Other individuals who are aware of an interaction with a dog, such as a trainer or retriever, are able to prepare themselves through the use of traditional instruments utilized for dog bite protection. These traditional instruments include padded accessories that surround the limbs, helmets to cover the head, batons, catch poles, and TASER devices. However, the aforementioned traditional instruments suffer from a number of drawbacks. For example, padded accessories and helmets are cumbersome instruments that fail to provide immediate protection from dog bites unless they are constantly worn. TASER devices are often considered as an overly aggressive form of protection and thus are typically only used as a last resort. Finally, batons and catch poles fail to provide adequate shielding of the human body from attacking dogs. It is with respect to these considerations and others that the various embodiments described herein have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A protective collapsible shield is provided. The protective collapsible shield may include a first panel, a second panel and a third panel. The first and second panels each have a rectangular protrusion or lip extending from a bottom edge. The third panel includes slots for housing the first panel and the second panel. The third panel further includes snapping straps for securing the first and second panels in the slots when the protective collapsible shield is in a retracted state. The third panel further includes multiple locking mechanisms. Each of the locking mechanisms includes a cylindrical rod, a handle fastened to the cylindrical rod and a housing for receiving the cylindrical rod. The locking mechanisms engage with the first and second rectangular protrusions to secure the first and second panels in the slots when the protective collapsible shield is in an extended state.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

A protective collapsible shield is provided. The protective collapsible shield may include a first panel, a second panel and a third panel. The first and second panels each have a rectangular protrusion or lip extending from a bottom edge. The third panel includes slots for housing the first panel and the second panel. The third panel further includes snapping straps for securing the first and second panels in the slots when the protective collapsible shield is in a retracted state. The third panel further includes multiple locking mechanisms. Each of the locking mechanisms includes a cylindrical rod, a handle fastened to the cylindrical rod and a housing for receiving the cylindrical rod. The locking mechanisms engage with the first and second rectangular protrusions to secure the first and second panels in the slots when the protective collapsible shield is in an extended state.

Figure 1:
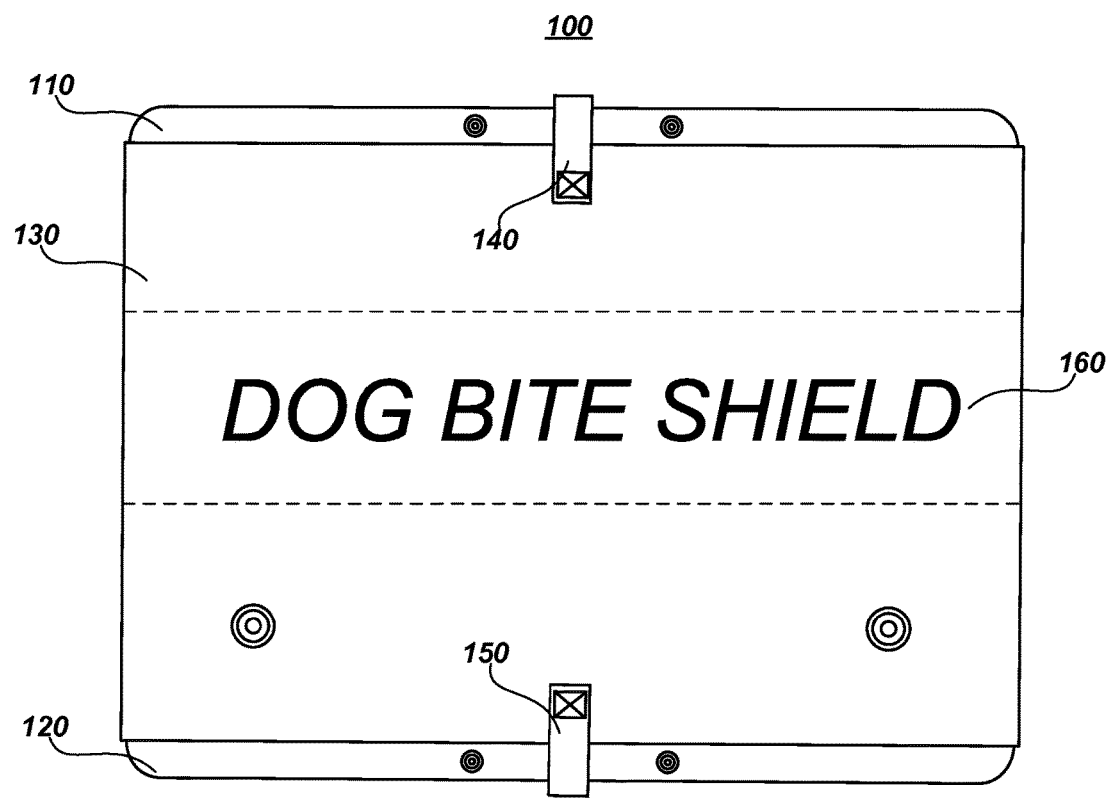
FIG. 1 is a front view of a protective collapsible shield with the top and bottom panels retracted, according to an embodiment.

Referring now to the drawings, in which like numerals represent like elements, various embodiments will be described. Referring now to FIG. 1, a front view of a protective collapsible shield 100 (hereinafter referred to as "the shield 100") is shown in accordance with an embodiment. The shield 100 is constructed of three panels (i.e., first, second and third panels). In particular, the shield 100 includes a top panel 110, a bottom panel 120 and a center (or central) panel 130. The top and bottom panels 110 and 120 are shown in a retracted state within respective slots (not shown) in the center panel 130. In an embodiment, the top and bottom panels 110 and 120 may each have an equivalent width which is slightly less than the width of the center panel 130. In an embodiment, the top and bottom panels 110 and 120 may have a height of 13 inches. In an embodiment, the center panel 130 may be 24 inches wide and 16 inches tall. Alternative embodiments may feature top, bottom and center panels of varying sizes. In an embodiment, the panels 110, 120 and 130 may be constructed from a durable plastic material suitable for protecting a user of the shield 100 from a dog attack. The panels 110, 120 and 130 may alternatively be constructed from other materials as well which are durable enough to perform the same functions. For example, in one embodiment, the panels 110, 120 and 130 may be constructed from aluminum. It should be appreciated that the shape and size of the panels 110, 120 and 130 of the shield 100 shown in FIG. 1 are illustrative only and that alternative embodiments may have dimensions and shapes which vary from those described above.

The shield 100 also includes snapping straps 140 and 150 which are affixed to the front face of the center panel 130. In an embodiment, the snapping straps 140 and 150 may be utilized to secure the top and bottom panels 110 and 120 within the center panel 130 when the shield 100 is in a retracted position (as shown in FIG. 1). In an embodiment, the snapping straps 140 and 150 may include a strip and a snap fastener. The strip may have two ends and be made from a rectangular fabric that has one end fixed centrally near the top or bottom edges of the front face of the center panel 130. The strip may be fixed to the center panel 130 using glue, bolts or any other comparable means of securely fixing the one end of the strip. The other end of the strip (not shown) may be loose with respect to the center panel 130 and includes the male member of a snap fastener. A female member for receiving the snap fastener (not shown) may be affixed to the back face of the center panel 130. When the male member and the female members are engaged, the snapping straps 140 and 150 prevent the slipping or escaping of the top and bottom panels 110 and 120 from the center panel 130 when the shield 100 is in a retracted position (i.e., not in use).

The shield 100 also includes an optional logo area 160 (shown between dashed lines) on the face of the center panel 130. The logo area 160 may be used to display text and/or graphics to identify one or more potential uses of the shield 100. For example, the logo area 160 may display a horizontal black stripe with white capitalized text which reads "DOG BITE SHIELD."

Figure 2:
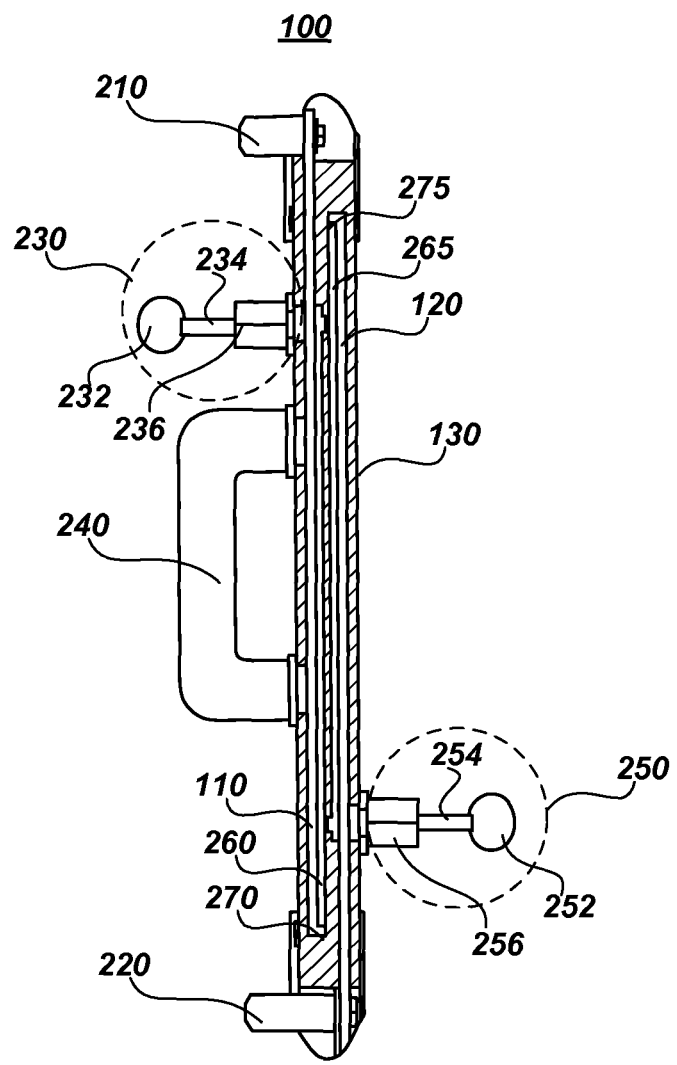
FIG. 2 is a right cross-sectional side view of the protective collapsible shield of FIG. 1 with the top and bottom panels retracted, according to an embodiment.

FIG. 2 is a right cross-sectional side view of the shield 100, according to an embodiment. As shown in FIG. 2, the shield 100 further includes horizontal straps 210 and 220, locking mechanisms 230 and 250 and a vertical strap 240. The shield 100 further includes slots 260 and 265 (within the center panel 130) for housing the top and bottom panels 110 and 120, respectively. The top and bottom panels 110 and 120 each include rectangular protrusions or lips 270 and 275.

In an embodiment, the horizontal strap 210 may be attached to and run along a top edge of the back of the top panel 110, while the horizontal strap 220 may be attached to and run along a bottom edge of the back of the bottom panel 120 (i.e., the horizontal strap 210 is positioned opposite to the horizontal strap 220). The horizontal straps 210 and 220 will be described in greater detail with respect to FIG. 3.

The locking mechanism 230 includes a handle 232, a rod 234 and a housing 236. Similarly, the locking mechanism 250 includes a handle 252, a rod 254 and a housing 256. In an embodiment, the rods 234 and 254 may be constructed of a solid cylindrical material and have a length that encompasses at least a length that extends from the slots 260 and 265 in the center panel 130 to a distance past the housings 236 and 256 of the locking mechanisms 230 and 250. In one embodiment, the rods 234 and 254 may each comprise a thin disk (not shown) that fits snugly within the housings 236 and 256 so as to function with a spring mechanism (not shown) located within each of the housings 236 and 256. The thin disk may be fixed to the rods 234 and 254 and pushed by the spring mechanism within the housings 236 and 256. In one embodiment, the spring mechanism comprises a spring that is secured underneath the top surface of each of the housings 236 and 256. The spring may exert constant pressure against the thin disk of the rods 234 and 254.

Each of the housings 236 and 256 may comprise an enclosure, a nut, and a threaded area. The enclosure may comprise a main body and an outer shell in the shape of a hexagon. Alternative embodiments of the enclosure may embody an outer shell having a variety of other shapes. The inner surface of the outer shell may have a circular cross-section and be permanently fixed to the outer surface of the main body. The nut, which comprises the base of the housings 236 and 256, may have a hexagonal cross-sectional shape. Alternative embodiments may comprise a variety of other cross-sectional shapes. The main housing and outer shell may protrude from the center of the top face of the nut. The bottom face of the nut is against the back face of the top panel 110 or the front face of the bottom panel 120, respectively. The threaded area is a protrusion from the bottom face of the nut. The threaded area may be a cylindrical protrusion having a threaded outer surface and a circular extrusion from the top face to the bottom face of the threaded area. The circular extrusion may have a diameter that snugly fits around each of the rods 234 and 254. The main housing, outer shell, nut, and threaded area may all be permanently fixed to one another.

As will be described in greater detail herein, the locking mechanisms 230 and 250 may be utilized to lock the top and bottom panels 110 and 120 when the shield 100 is in an extended state and to unlock the top and bottom panels 110 and 120 to facilitate returning the shield 100 to a retracted state. Although only two locking mechanisms are shown in FIG. 2 (i.e., the locking mechanisms 230 and 250), it should be understood that there may be a total of four locking mechanisms on the shield 100 in accordance with an embodiment. In particular, two locking mechanisms may be located along the back face of the center panel 130 and two additional locking mechanisms may be located along the front face of the center panel 130.

The vertical strap 240 may comprise a fabric strap that is attached to the center panel 130 and that enables a user to hold the shield 100. The vertical strap 240 may be one of multiple straps that are attached to the shield 100 to facilitate holding the shield during use. The vertical strap 240 will be described in greater detail below with respect to FIG. 3.

As discussed above, the slots 260 and 265 in the center panel 130 of the shield 100 may be utilized to house the top and bottom panels 110 and 120. The slots 260 and 265 may comprise cavities with varying thickness within the center panel 130. In one embodiment, the slot 265 for receiving the bottom panel 120 may be positioned in front of the slot 260 of the top panel 110. The slots 260 and 265 may be of equal depth such that when the top and bottom panels 110 and 120 are retracted within the slots 260 and 265, the slots 260 and 265 conceal the portion of the top panel 110 that is beneath the horizontal strap 210 and the portion of the bottom panel 120 that is above the horizontal strap 220. The width of each of the slots 260 and 265 is wide enough to conceal the sides of the top and bottom panels 110 and 120 when retracted. The portion of the top and bottom panels 110 and 120 that is exposed when the shield 100 is expanded is based on the varying thickness within the center panel 130. In one embodiment, the center panel 130 comprises a deeper thickness that is between the bottom of the center panel 130 and a small distance above the bottom of the center panel 130 (until the point at which the slot 260 housing the top panel 110 is reached) as well as between the top of the center panel 130 and a small distance above the top of the center panel 130 (until the point at which the slot 265 housing the bottom panel 120 is reached). A thinner thickness begins at the point the respective slots 260 and 265 begin in the center panel 130.

In one embodiment, the distance between the rods 234 and 254 of the locking mechanisms 230 and 250 and the thinner thickness is one that securely surrounds the lips 270 and 275 of the top and bottom panels 110 and 120, thereby preventing the top and bottom panels 110 and 120 from moving between the rods 234 and 254 of the locking mechanisms 230 and 250 and the thinner thickness of the slots 260 and 265. As will be described in greater detail below with respect to FIG. 5, when the top and bottom panels 110 and 120 are in their extended states (i.e., when the shield 100 is in an extended state), the rods 234 and 254 of the locking mechanisms 230 and 250 are engaged with the bottom face of the top and bottom panels 110 and 120 while the top of the lips 270 and 275 are in contact with the top surface of the thicker thickness of the slots 260 and 265.

Figure 3:
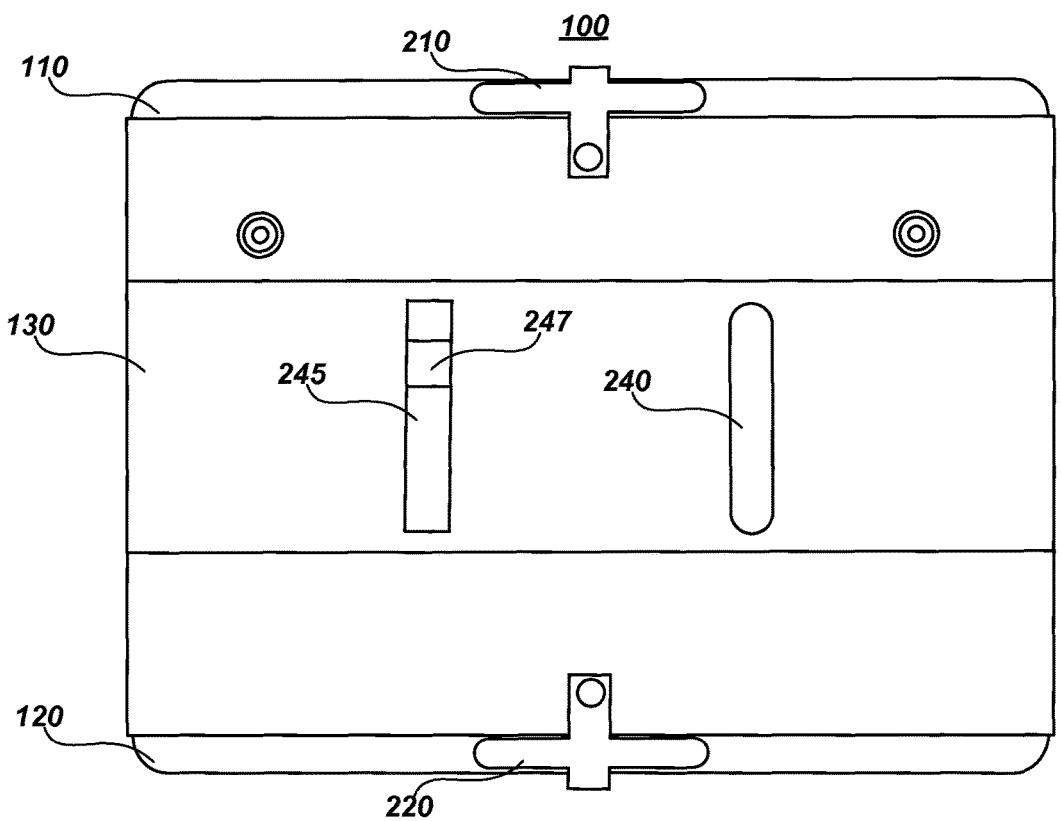
FIG. 3 is a back view of the protective collapsible shield of FIG. 1 with the top and bottom panels retracted, according to an embodiment.

FIG. 3 is a back view of the shield 100 of FIG. 1, according to an embodiment. As discussed above, the shield 100 includes the top panel 110, the bottom panel 120, the center panel 130, the horizontal straps 210 and 220 and the vertical strap 240. The shield 100 also includes an additional vertical strap 245.

In an embodiment, the horizontal straps 210 and 220 may be placed equidistant from the side edges of the respective top and bottom panels 110 and 120. In an embodiment, each of the horizontal straps 210 and 220 may comprise a horizontal extrusion, a vertical extrusion and a securing means. The horizontal extrusion may intersect with the vertical extrusion. In one embodiment, the intersections between the horizontal and vertical extrusions are slight curvatures that create a smooth surface from the top of each of the horizontal straps 210 and 220 to the sides of each of the horizontal straps 210 and 220. In an embodiment, each of the horizontal straps 210 and 220 may be 6 inches in length, 0.75 inch in width, and 1.80 inches in height. Alternative embodiments may embody a pair of horizontal straps having an ornamental design other than what has just been described. The securing means (discussed above) may be attached to the bottom faces of the vertical extrusions. In one embodiment, the securing means may comprise a pair of screws. Alternative embodiments may utilize other types of securing means to affix the horizontal straps 210 and 220 onto the back faces of the top and bottom panels 110 and 120.

The vertical straps 240 and 245 may be located near the center of the center panel 130. The vertical straps 240 and 245 may be parallel to each other and equidistant from the side edges of the center panel 130. In one embodiment, each of the vertical straps 240 and 245 may be 6 inches in length and 1.13 inches in width. In one embodiment, the vertical strap 240 may be of the same construction as the horizontal straps 210 and 220 while the vertical strap 245 may comprise a fabric belt, an adjustment mechanism 247 and a securing means (not shown) for securing both the vertical strap 240 and the vertical strap 245 to the center panel 130. In one embodiment, the securing means may penetrate from the back face of the center panel 130 up to the inner surface of the slot 260 of the top panel 110 such that the securing means does not pose a disturbance to the path traveled by the top panel 110 as it is being expanded and retracted in the shield 100.

The fabric belt may comprise a vertical rectangular material that has the securing means attached to the top and bottom of the back surface of the center panel 130. The adjustment mechanism 247 serves to extend or shorten the length of the strap. In one embodiment, the adjustment mechanism 247 may be a slide loop. Other types of adjustment mechanisms may also be utilized. In some embodiments, the positions of the vertical straps 240 and 245 may be reversed in order to accommodate a left or right-handed user (depending on the initial orientation of the straps).

In accordance with an embodiment, regardless of whether the top and bottom panels 110 and 120 are retracted or extended, a user may secure his or her arm in the vertical straps 240 and 245 on the center panel 130. For example, a user may initially slip his or her forearm through the vertical strap 245 until his or her hand reaches the vertical strap 240. The user may then grab the vertical strap 240 with his or her hand and adjust the vertical strap 245 to a comfortable, secure length that fits for his or her forearm. In order to adjust the length of the vertical strap 245 around his or her forearm, the user may engage the adjustment mechanism 247 in a similar fashion as seat belts in traditional vehicles are used and other similar items. The user may then move the shield 100 by moving his or her left arm (based on the vertical straps being arranged in a right-handed configuration) and use his or her right arm for other purposes. In an alternative embodiment, the center panel 130 may be configured to have vertical straps that allow the shield 100 to be carried on a user's back. In this embodiment, the vertical straps may be similar in structure to that of a backpack. Varying styles of straps may be used in the alternate embodiment that allows the user to carry the shield 100 on his or her back.

Figure 4:
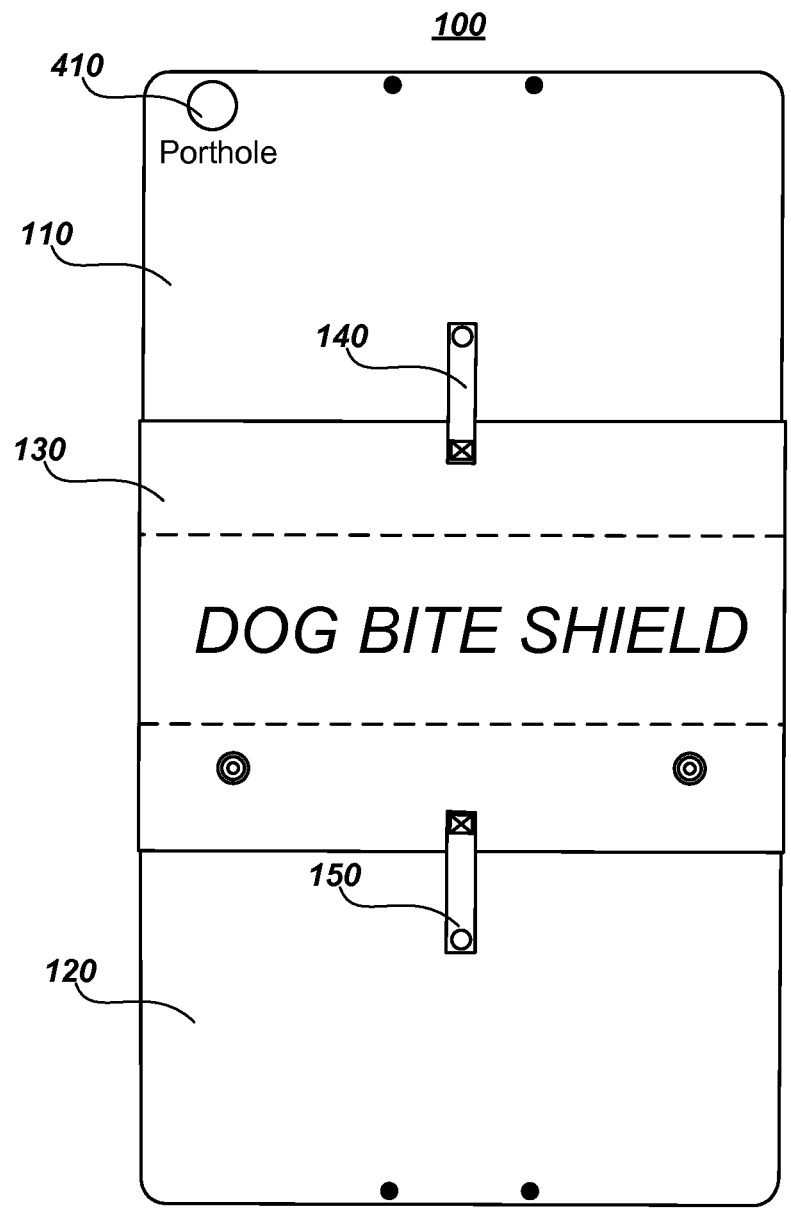
FIG. 4 is a front view of the protective collapsible shield of FIG. 1 with the top and bottom panels extended, according to an embodiment.

FIG. 4 is a front view of the shield 100 of FIG. 1, according to an embodiment. As discussed above, the shield 100 includes the top panel 110, the bottom panel 120, the center panel 130 and the snapping straps 140 and 150. The shield 100 also includes a porthole 410. The porthole 410 may comprise a downward diagonal extrusion from an edge of the top panel 110. The extrusion may be a hole that penetrates from the front face of the top panel 110 through the back face of the top panel 110. The porthole 410 may be a certain distance under the top right corner of the top panel 110 (as viewed from the back). The porthole 410 may comprise a circular portion that aids the user by creating a border that allows for movements of a catch pole within a given area, making for a more accurate positioning of the catch pole. The size of the extrusion may be large enough for the movement of a catch pole but small enough to give the user control over the catch pole and the positioning of the catch pole. In order to engage the porthole 410 of the top panel 110, the user may slip the catch pole or other items of similar construction through the opening of the porthole 410 (located on the right side of the top panel when viewed from the back of the shield 100).

Figure 5:
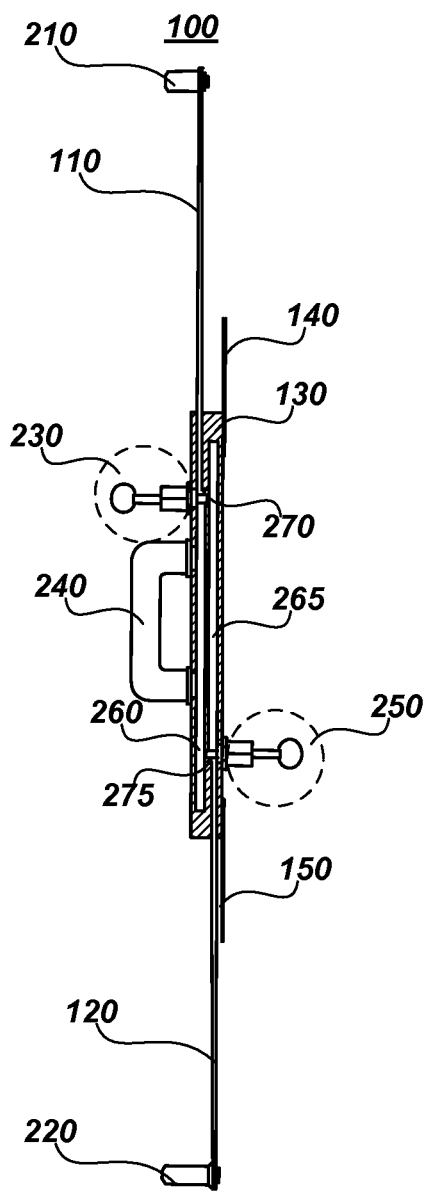
FIG. 5 is a right cross-sectional side view of the protective collapsible shield of FIG. 1 with the top and bottom panels extended, according to an embodiment.

FIG. 5 is a right cross-sectional side view of the shield 100 of FIG. 1, according to an embodiment. As discussed above, the shield 100 includes the top panel 110 (including the lip 270), the bottom panel 120 (including the lip 275), the center panel 130, the snapping straps 140 and 150, the horizontal straps 210 and 220, the locking mechanisms 230 and 250, the vertical strap 240 and the slots 260 and 265. As shown in FIG. 5, the shield 100 is in an extended state with the rods (e.g., the rods 234 and 254 of FIG. 2) of the locking mechanisms 230 and 250 being engaged with the bottom face of the top and bottom panels 110 and 120 while the top of the lips 270 and 275 are in contact with the top surface of the thicker thickness of the slots 260 and 265.

In an embodiment, the shield 100 may be placed in the extended state by a user unhooking the snapping straps 140 and 150 from the back face of the center panel 130. The user may then extend a first panel (e.g., the top panel 110) from its retracted location within the slot 260 by pulling on the handle of the locking mechanism 230 to retract the rod from the slot 260 in the center panel 130. The user may then pull upward on the horizontal strap 210 to extend the top panel 110 until the lip 270 makes contact and is engaged with the rod of the locking mechanism 230 and the top surface of the thicker thickness of the slot 260. The handle of the locking mechanism 230 may then be released and the rod of the locking mechanism 230 may then be pushed (e.g., by a spring) through the slot 260 in the center panel 130 to engage with depressions contained within the slot 260 within the center panel 130. The user may then repeat the above-described process to extend the bottom panel 120 from its retracted location within the slot 265 using the horizontal strap 220 (i.e., pulling the horizontal strap 220 downward) and the locking mechanism 250.

In an embodiment, the shield 100 may be placed in a retracted state by a user pulling on the handle of the locking mechanism 230 to retract the rod from the slot 260 in the center panel 130. In particular, the handle is pulled until the rod of the locking mechanism 230 is pulled completely past the slot 260 in the center panel 130 so as to allow the passage of the top panel 110 back within the slot 260 (i.e., via the user pulling the horizontal strap 210 downward). Once the top panel 110 has reached the bottom of the slot 260, the handle of the locking mechanism 230 is released and the rod of the locking mechanism is automatically pushed (e.g., by a spring) into the slot 260 in the center panel 130. In order to prevent the top panel 110 from slipping out of the slot 260 after being retracted, the user may secure the snapping strap 140 by inserting the male member of the snapping strap 140 on one side of the center panel 130 into the corresponding female member on the opposite side of the center panel 130. The user may then repeat the above-described process to retract the bottom panel 120 from its extended state into the slot 265 using the horizontal strap 220 (i.e., pulling the horizontal strap 220 upward), the locking mechanism 250 and the snapping strap 150.

Figure 6:
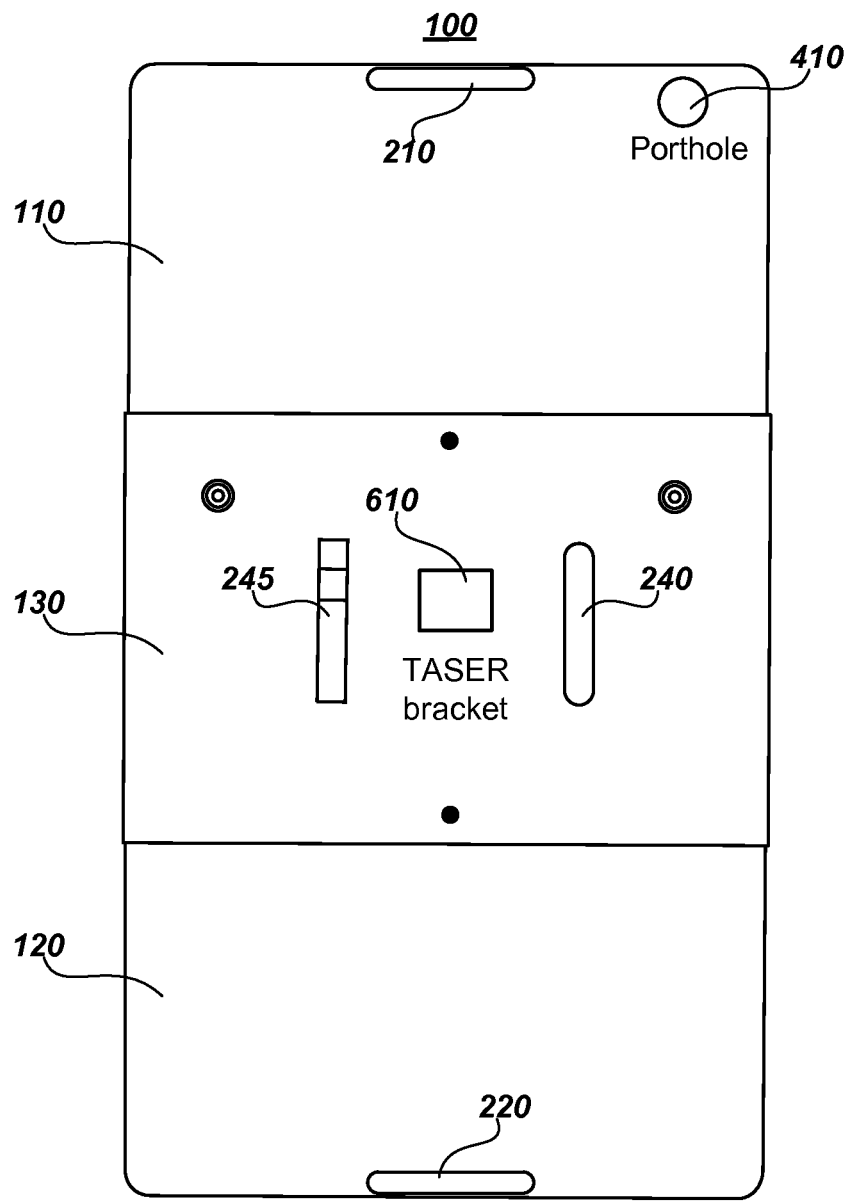
FIG. 6 is a back view of the protective collapsible shield of FIG. 1 with the top and bottom panels extended, according to an embodiment.

FIG. 6 is a back view of the shield 100 of FIG. 1, according to an embodiment. As discussed above, the shield 100 includes the top panel 110, the bottom panel 120, the center panel 130, the snapping straps 140 and 150, the horizontal straps 210 and 220, the vertical straps 240 and 245 and the porthole 410. The shield 100 also includes a TASER bracket 610. In an embodiment, the TASER bracket 610 may be centrally located on the center panel 130 (i.e., between the vertical straps 240 and 245) so that it may be easily accessible by a user when holding the shield 100. The TASER bracket 610 may be a holder that allows for the placement of a TASER device. The TASER bracket 610 may comprise all of the necessary components found in conventional TASER brackets that hold a TASER device upon a surface. In one embodiment, the TASER bracket 610 may comprise a hard plastic clip. In order to use the TASER bracket 610, a TASER device may be placed into the TASER bracket 610. A user may then remove the TASER device from the bracket to use on an attacking dog as necessary.

Figure 7:
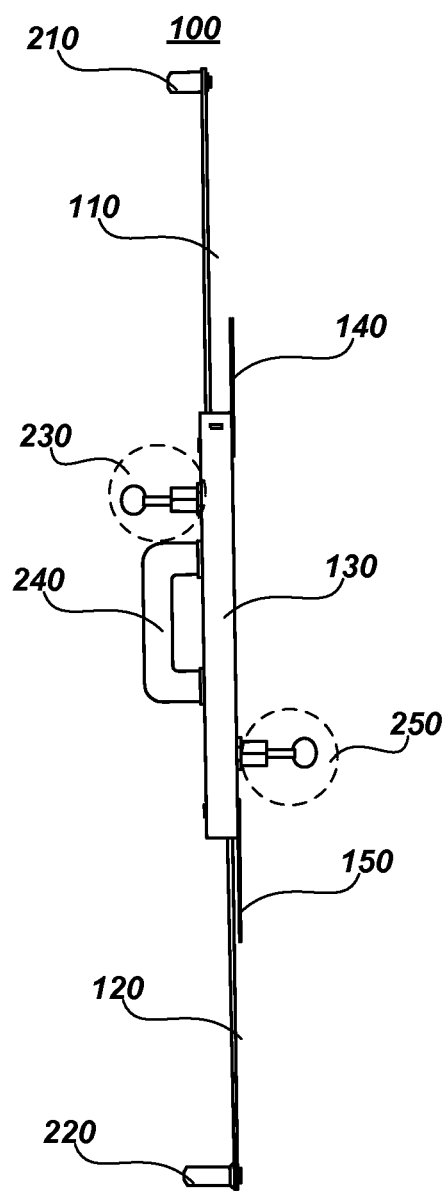
FIG. 7 is a right side view of the protective collapsible shield of FIG. 1 with the top and bottom panels extended, according to an embodiment.

FIG. 7 is a right side view of the shield 100 of FIG. 1, according to an embodiment. As discussed above, the shield 100 includes the top panel 110, the bottom panel 120, the center panel 130, the snapping straps 140 and 150, the horizontal straps 210 and 220, the locking mechanisms 230 and 250 and the vertical strap 240. As previously described in FIG. 5, the shield 100 is in an extended state. It should be understood that the various straps described herein (e.g., the snapping straps 140 and 150, the horizontal straps 210 and 220, and the vertical strap 240) may be constructed from plastic, rubber, metal or a combination thereof.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A protective collapsible shield, comprising:
   a first panel comprising a first rectangular protrusion extending from a bottom edge of the first panel;
   a second panel comprising a second rectangular protrusion extending from a bottom edge of the second panel; and
   a third panel comprising:
     a plurality of slots for housing the first panel and the second panel;
     a plurality of snapping straps for securing the first panel and the second panel in the plurality of slots when the protective collapsible shield is in a retracted state; and
     a plurality of locking mechanisms, each of the plurality of locking mechanisms comprising:
       a cylindrical rod;
       a handle fastened to the cylindrical rod; and
       a housing for receiving the cylindrical rod;
   wherein the plurality of locking mechanisms engages with the first and second rectangular protrusions to secure the first and second panels in the plurality of slots when the protective collapsible shield is in an extended state.

2. The protective collapsible shield of claim 1, wherein a first one of the plurality of slots is positioned in front of a second one of the plurality of slots in the third panel.

3. The protective collapsible shield of claim 1, wherein the first panel further comprises a first horizontal strap located along a top edge of the first panel, the first horizontal strap being utilized to extend the first panel from a first one of the plurality of slots in the third panel when the protective collapsible shield is in the extended state and retract the first panel into the first one of the plurality of slots in the third panel when the protective collapsible shield is in the retracted state.

4. The protective collapsible shield of claim 3, wherein the second panel further comprises a second horizontal strap located opposite the first horizontal strap, the second horizontal strap being further located along a bottom edge of the second panel, the second horizontal strap being utilized to extend the second panel from a second one of the plurality of slots in the third panel when the protective collapsible shield is in the extended state and retract the second panel into the second one of the plurality of slots in the third panel when the protective collapsible shield is in the retracted state.

5. The protective collapsible shield of claim 4, wherein the first and second panels are extended from the third panel in response to the handle of each of the plurality of locking mechanisms being pulled to retract the rod from the housing, the first horizontal strap being pulled in an upward direction to extend the first panel from the first one of the plurality of slots in the third panel, the second horizontal strap being pulled in a downward direction to extend the second panel from the second one of the plurality of slots in the third panel, and the handle of each of the plurality of the locking mechanisms being released to push the rod into the housing, wherein the collapsible shield is in the extended state when the first and second rectangular protrusions are fixed between the rod and a thickness of the plurality of slots in the third panel that prevents further movement of the first and second panels.

6. The collapsible shield of claim 5, wherein the first and second panels are retracted into the third panel in response to the handle of each of the plurality of locking mechanisms being pulled to retract the rod from the housing, the first horizontal strap being pulled in an downward direction to retract the first panel into the first one of the plurality of slots in the third panel, the second horizontal strap being pulled in a upward direction to retract the second panel into the second one of the plurality of slots in the third panel, the handle of each of the plurality of the locking mechanisms being released to push the rod into the housing, wherein the collapsible shield is in the retracted state when the plurality of snapping straps is engaged with the first and second panels.

7. The protective collapsible shield of claim 1, wherein the third panel further comprises a plurality of vertical straps for receiving a forearm of a user.

8. The protective collapsible shield of claim 1, wherein the first, second and third panels comprise a durable plastic material to protect a user from a dog attack.

9. The protective collapsible shield of claim 1, wherein the plurality of slots comprises a width that conceals a plurality of sides of the first and second panels when the protective collapsible shield is in the retracted state.

10. The protective collapsible shield of claim 1, further comprising:
   a porthole penetrating from a front face to a back face of the first panel, the porthole comprising a diameter for receiving a catch pole; and
   a bracket for holding a TASER device, the bracket being attached to a back face of the center panel.

11. A collapsible shield, comprising:
   a top panel comprising a first lip extending from a bottom edge of the top panel;
   a bottom panel comprising a second lip extending from a bottom edge of the bottom panel; and
   a center panel having a varying thickness, the center panel comprising:
      a plurality of slots for housing the top panel and the bottom panel, wherein a first one of the plurality of slots is positioned in front of a second one of the plurality of slots;
      a plurality of snapping straps for securing the top panel and the bottom panel in the plurality of slots when the collapsible shield is in a retracted state; and
      a plurality of locking mechanisms, each of the plurality of locking mechanisms comprising:
         a rod;
         a handle fastened to the rod; and
         a housing for receiving the rod;
      wherein the plurality of locking mechanisms engages with the first and second lips to secure the top and bottom panels in the plurality of slots when the collapsible shield is in an extended state.

12. The collapsible shield of claim 11, wherein the top panel further comprises a first horizontal strap located along a top edge of the top panel, the first horizontal strap being utilized to extend the top panel from the first one of the plurality of slots in the center panel when the collapsible shield is in the extended state and retract the top panel into the first one of the plurality of slots in the center panel when the collapsible shield is in the retracted state.

13. The collapsible shield of claim 12, wherein the bottom panel further comprises a second horizontal strap located opposite the first horizontal strap, the second horizontal strap being further located along a bottom edge of the bottom panel, the second horizontal strap being utilized to extend the bottom panel from the second one of the plurality of slots in the center panel when the collapsible shield is in the extended state and retract the bottom panel into the second one of the plurality of slots in the center panel when the collapsible shield is in the retracted state.

14. The collapsible shield of claim 13, wherein the top and bottom panels are extended from the center panel in response to the handle of each of the plurality of locking mechanisms being pulled to retract the rod from the housing, the first horizontal strap being pulled in an upward direction to extend the top panel from the first one of the plurality of slots in the center panel, the second horizontal strap being pulled in a downward direction to extend the bottom panel from the second one of the plurality of slots in the center panel, and the handle of each of the plurality of the locking mechanisms being released to push the rod into the housing, wherein the collapsible shield is in the extended state when the first and second lips are fixed between the rod and a thickness of the plurality of slots in the center panel that prevents further movement of the top and bottom panels.

15. The collapsible shield of claim 14, wherein the top and bottom panels are retracted into the center panel in response to the handle of each of the plurality of locking mechanisms being pulled to retract the rod from the housing, the first horizontal strap being pulled in a downward direction to retract the top panel into the first one of the plurality of slots in the center panel, the second horizontal strap being pulled in an upward direction to retract the bottom panel into the second one of the plurality of slots in the center panel, the handle of each of the plurality of the locking mechanisms being released to push the rod into the housing, wherein the collapsible shield is in the retracted state when the plurality of snapping straps are engaged with the top and bottom panels.

16. The collapsible shield of claim 11, wherein the center panel further comprises a plurality of vertical straps for receiving a forearm of a user.

17. The collapsible shield of claim 11, wherein the top, bottom and center panels comprise a durable plastic material to protect a user from a dog attack.

18. The collapsible shield of claim 11, wherein the plurality of slots comprises a width that conceals a plurality of sides of the top and bottom panels when the collapsible shield is in the retracted state.

19. The collapsible shield of claim 11, further comprising a porthole penetrating from a front face to a back face of the top panel, the porthole comprising a diameter for receiving a catch pole.

20. The collapsible shield of claim 11, further comprising a bracket for holding a TASER device, the bracket being attached to a back face of the center panel.

* * * * *